F. S. BOLTZ

TANK

Original Filed Jan. 20, 1928

Inventor:
Fred S. Boltz
By Macleod, Calver, Copeland & Dike
Attorneys.

Patented Apr. 12, 1932

1,853,112

UNITED STATES PATENT OFFICE

FRED S. BOLTZ, OF MANSFIELD, MASSACHUSETTS

TANK

Original application filed January 20, 1928, Serial No. 248,146. Divided and this application filed May 16, 1929. Serial No. 363,513.

The invention relates to an improvement in tanks. It is especially intended for application to tanks which are intended for use as containers for hot water or other liquids or substances which have a tendency to corrode metal. When the tank is made entirely of sheet steel or other corrodible metal, it soon becomes corroded thereby causing the tank to leak and discoloring the liquid in the tank. The use of non-corrodible metal for the entire tank is very expensive if the sheets of which the tank is made are sufficiently thick to give the necessary strength. It has, therefore, become common to make the tank with an inner shell or lining of non-corrodible metal and with an outer or reenforcing shell of steel or other relatively cheap metal which is corrodible.

This application is a division of an application filed by me January 20, 1928, Serial No. 248,146 and relates to the connection between the heads and the body of the tank.

One object of the present invention is to provide a joint between the heads and the ends of the shell which will be non-corrodible.

Another object is to provide an interlocking joint between the heads and the ends of shell of the tank both to prevent leakage and to resist the outward pressure of the contents of the tank.

The invention will be fully understood from the following description when taken in connection with the accompanying drawings and the novel features thereof will be pointed out and clearly defined in the claims at the close of this specification.

Figure 1:
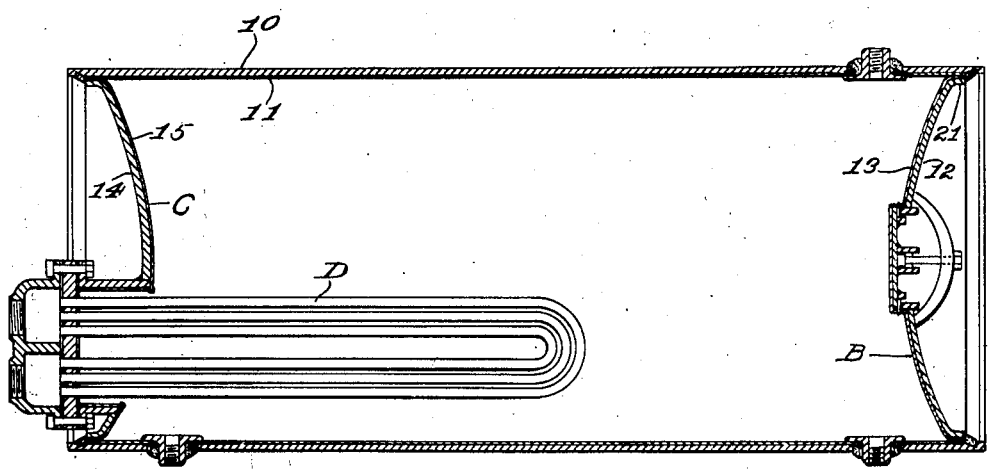
Fig. 1 is a longitudinal section of a tank embodying the invention.

Referring to the drawings, there is shown at 10 a tubular outer or reenforcing shell of the tank which may be made of steel or other corrodible sheet metal and at 11 is shown an inner shell of non-corrodible sheet metal, preferably brass, copper or monel. Each of these shells may be made of sheet metal rolled into cylindrical form and having a longitudinal union or joint at the meeting edges. The ends of the tank are provided respectively with two heads, B, C preferably dished inward. At D is shown a heating element connected with the head C in any suitable manner. Any suitable heating element may be used for this purpose or the heating element may be omitted, the invention not being limited to use with hot water tanks. The head B is formed with an outer plate 12 which may be of corrodible metal and a thin lining member 13 of non-corrodible sheet metal similar to the outer and inner members of the cylindrical portion of the tank. In the same manner the head C is formed with an outer portion 14 which may be of steel or any other kind of metal, and an inner lining 15 of non-corrodible metal.

Figure 2:
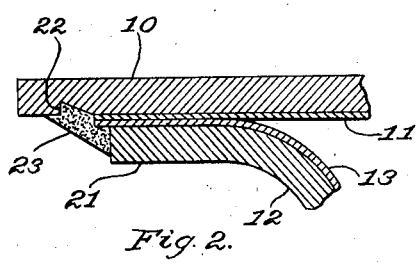
Fig. 2 is an enlarged detail view showing the joint between one of the heads and the inner and outer shell.

The reenforcing head member 12 has a peripheral flange 21 which extends outwardly parallel with the outer shell portion 10 and the non-corrodible lining member 13 has a flange which extends parallel with and in contact with the non-corrodible lining 11 of the tubular shell member of the tank. The non-corrodible lining members 11, 13 preferably extend outward somewhat beyond the outer end of the flange portion 21 of the head 12 as shown in Fig. 2, and the outer shell 10 extends some distance outward beyond the ends of said non-corrodible lining members 11 and 13. The outer shell 10 is preferably formed on its inner periphery with a peripheral notch or groove 22. The reenforcing outer shell 10, the reenforcing disk 21 of the head, and the two interposed non-corrodible lining members 11 and 13 are all secured together by a filling of solder, welding material or brazing 23 or equivalent material as shown in Fig. 2. This solder or brazing substance will completely close the joint at the end between the two lining members of the head and the outer shell and prevent moisture from passing through the joint. The interlocking of the solder 23 with the notch in the outer shell 10 performs a further function in that it resists the outward pressure of the contents of the tank against the head.

The interlocking connection of the head C with the tank is similar to that of the head B.

What I claim is:

1. A metal tank comprising a tubular outer shell, a lining therefor of non-corrodible metal, the outer shell extending beyond the end of the lining shell, a metallic head comprising an outer disk and a non-corrodible metal lining therefor fitted into the end of the shell, said head and lining disks each having a cylindrical flange which extends toward the outer end of the shell, the outer shell extending somewhat beyond the end of the lining shell and the head flanges, the extended portion of said outer shell having an annular notch in its inner periphery, and a binding substance filling said notch and covering the ends of said lining shell and the ends of the head flanges.

2. A sheet metal tank comprising an inner tubular shell of non-corrodible sheet metal, a reenforcing outer metal shell, said tank having a metallic head comprising an outer disk of metal and a lining of non-corrodible metal, said head being inserted into the end of the shell, each member of said head having an annular flange, the flange of the non-corrodible head lining fitting against the inner periphery of the lining of the tubular shell, a binding substance uniting the said head to the tubular shell at its ends and covering the joint between the head and the shell, the outer shell extending some distance beyond the end of the head flange, the outer shell being formed with a notch into which the said binding substance extends.

3. A tank comprising an outer metallic tubular shell, a lining shell therefor of non-corrodible metal, a metallic head fitted into said shell at some distance back from the end of the shell and having a cylindrical peripheral flange extending toward the end of the shell, the outer shell extending beyond the end of the said head flange, said extension having an annular notch in its inner periphery, and a binding substance filling said notch and covering the joints between the flanges.

4. A tank consisting of a tubular metallic shell formed with a recess in its inner periphery near the end of the shell, a metallic head inserted into said shell somewhat further in from the end than the said recess, said head having an annular flange extending toward the outer end of the shell and lying against the inner face of the shell, and a uniting substance covering the joint between the inner and outer members of the head and the shell and extending into said recess.

5. A tank comprising an outer metallic tubular shell, a metallic lining shell therefor, a metallic head comprising an outer disk and a metallic lining therefor, said head and its lining each having a cylindrical flange which extends axially outward, the said lining flange of the head fitting into the mouth of the shell lining, the outer tubular shell extending outward somewhat beyond the ends of the said tubular linings of the shell and of the head members, the projecting portion of said outer shell having an annular notch in its inner periphery and a binding substance which covers the ends of said lining shell and of said head flanges and engages with said notch.

6. A tank comprising an outer metallic tubular shell, a metallic lining shell therefor, a metallic head comprising an outer disk and a metallic lining therefor, said head and its lining each having a cylindrical flange which extends axially outward, the said lining flange of the head fitting into the mouth of the shell lining, the outer tubular shell extending outward somewhat beyond the ends of the said tubular linings of the shell and of the head members, the linings of the shell and the head member projecting upward beyond the tubular flange of the main head member, the projecting portion of said outer shell having an annular notch in its inner periphery and a binding substance which covers the ends of said lining shell and of said head flanges and engages with said notch.

In testimony whereof I affix my signature.

FRED S. BOLTZ.